United States Patent [19]

Kuhl

[11] 3,848,828

[45] Nov. 19, 1974

[54] ENERGY TRANSFORMER FOR SECURING A SAFETY BELT ON A SEAT OF A VEHICLE

[76] Inventor: Hans Kuhl, Kornbergweg 12, Plochingen, Germany

[22] Filed: Feb. 18, 1972

[21] Appl. No.: 227,378

Related U.S. Application Data

[63] Continuation of Ser. No. 823,677, May 12, 1969, abandoned.

[30] Foreign Application Priority Data

May 13, 1968 Germany.......................... 1755464

[52] U.S. Cl................. 242/107.3, 242/99, 297/386
[51] Int. Cl...................... A62b 35/00, B65h 75/48
[58] Field of Search .... 242/107.2, 99, 107.3, 107.4, 242/107.5, 107 SB; 297/386, 387, 388; 280/150 SB; 188/82.3, 82.34, 82.4, 82.74, 82.9, 83

[56] References Cited
UNITED STATES PATENTS

| | | | |
|---|---|---|---|
| 3,058,687 | 10/1962 | Bentley | 242/107.4 |
| 3,182,962 | 5/1965 | Gray | 242/107.3 |
| 3,308,902 | 3/1967 | Carter | 242/107.4 |
| 3,442,466 | 5/1969 | Fritsche | 242/107.4 |
| R11,067 | 3/1890 | Griswold | 242/107.3 |

*Primary Examiner*—John W. Huckert
*Assistant Examiner*—Jon W. Henry
*Attorney, Agent, or Firm*—Ernest G. Montague; Karl F. Ross; Herbert Dubno

[57] ABSTRACT

In combination with a safety belt, an energy transformer securing a safety belt selectively to a seat of a vehicle and to a vehicle itself, which comprises a housing and a drum having a recess rotatably mounted. Belt means are wound on the drum. The drum has a central bore. A hub is disposed in the recess. A laminated friction brake including inner plates and outer plates is provided, to constitute a plate package. The outer plates are connected with the drum for joint rotation with the latter. The inner plates are connected with the hub for joint rotation with the latter. A spring is arranged for pressing the plates of the plate package against each other. A device for varying the pressure applied to the brake package is provided, which device limits the length of the belt means unwinding the drum. A coupling member is axially displaceable relative to and disposed in the center of the hub. A disc has a front gearing disposed coaxially with the coupling member and is connected with the housing. A second gearing is provided on one end of the coupling member for releasable engagement with the first gear. A spring is arranged for retaining the first gearing in engagement with the second gearing and the coupling member forms jointly with the disc a switchable free wheel arrangement, to permit rotation of the drum jointly with the outer plates relative to the hub jointly with the inner plates connected with the housing.

3 Claims, 6 Drawing Figures

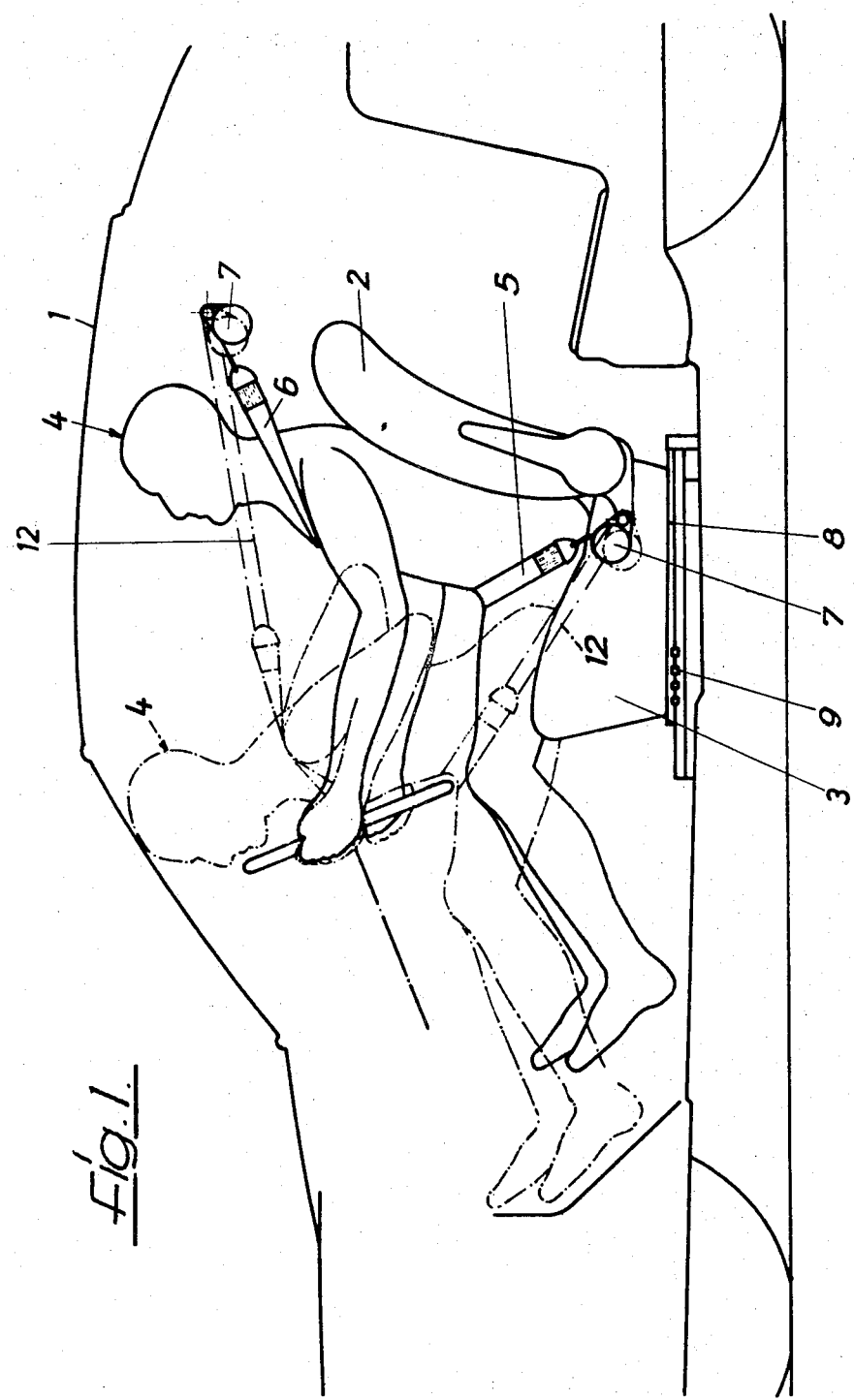

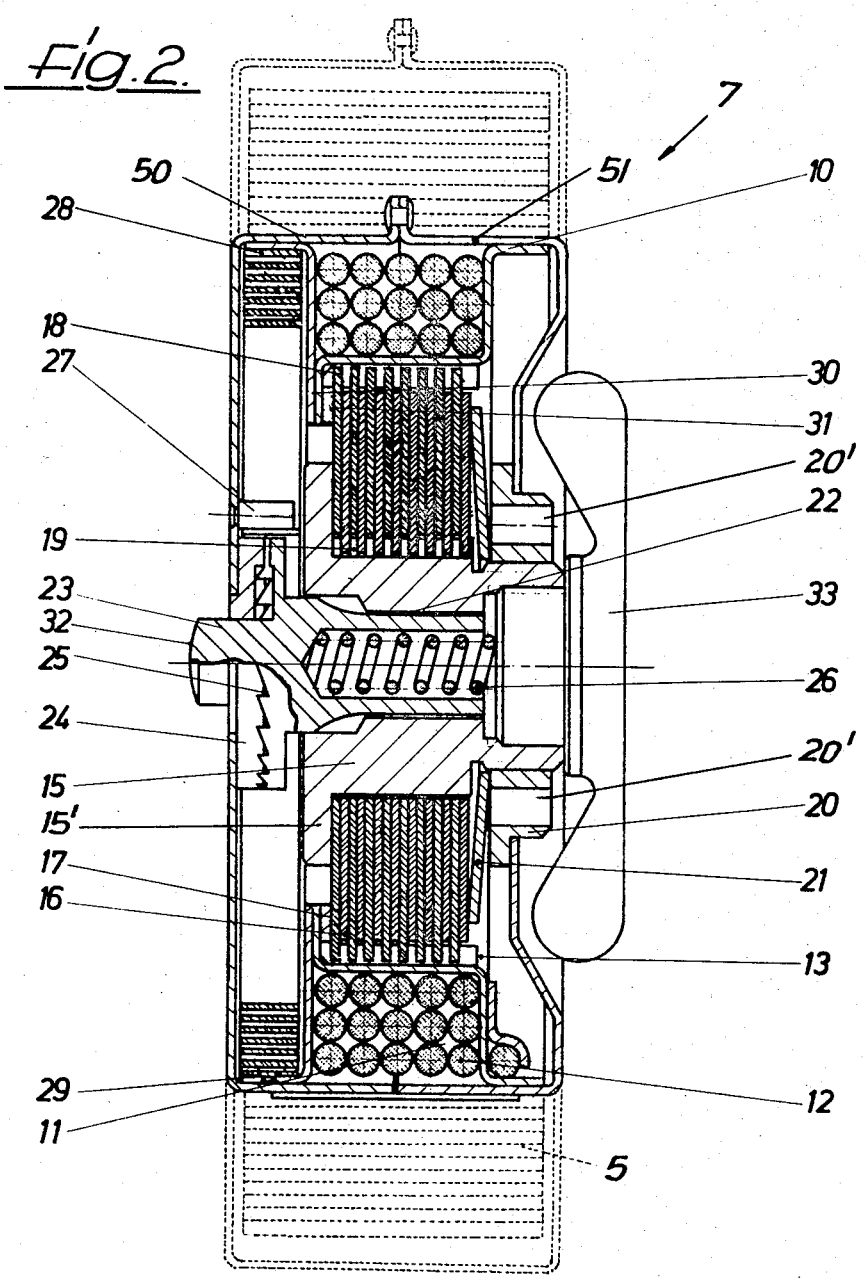

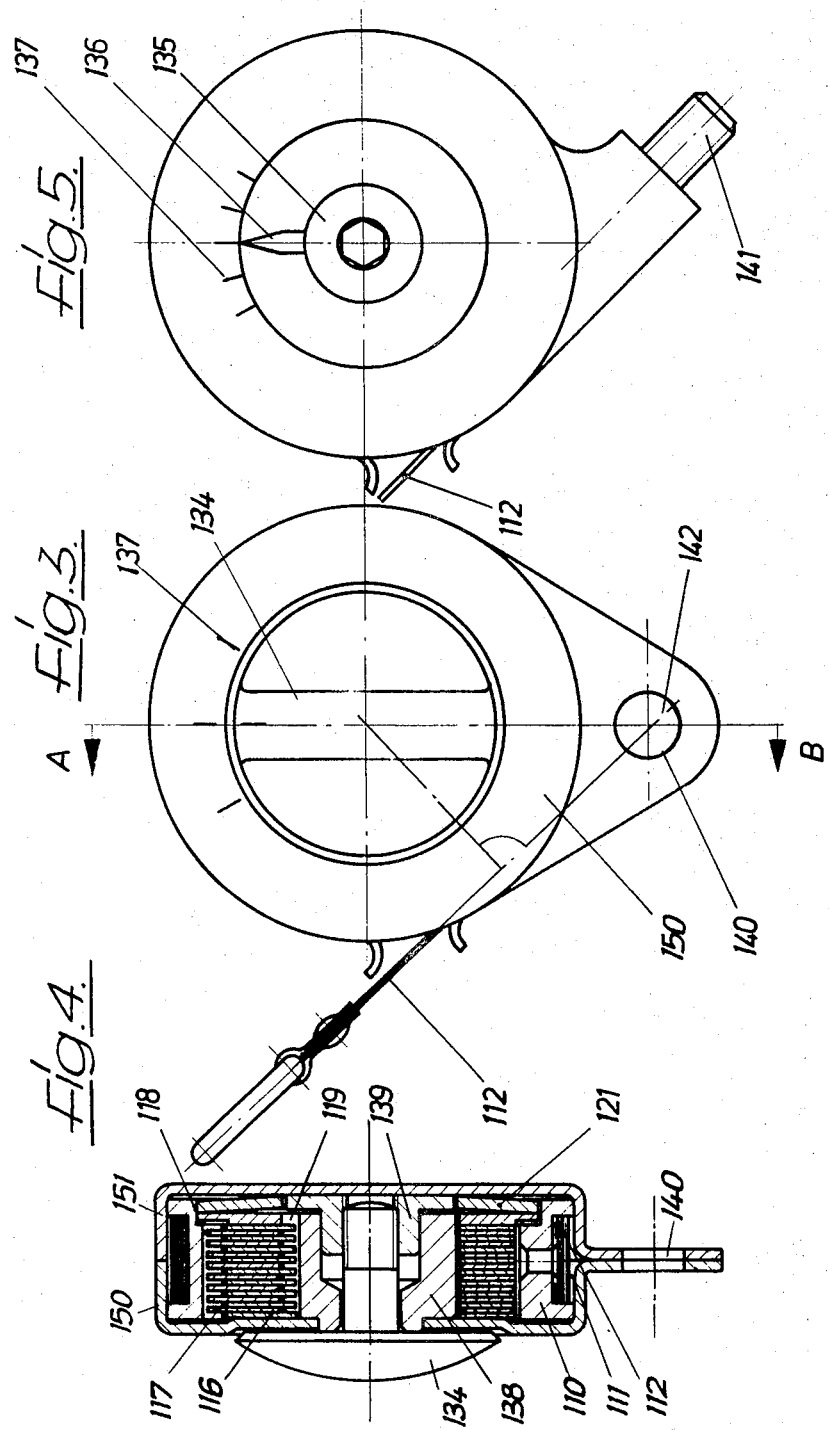

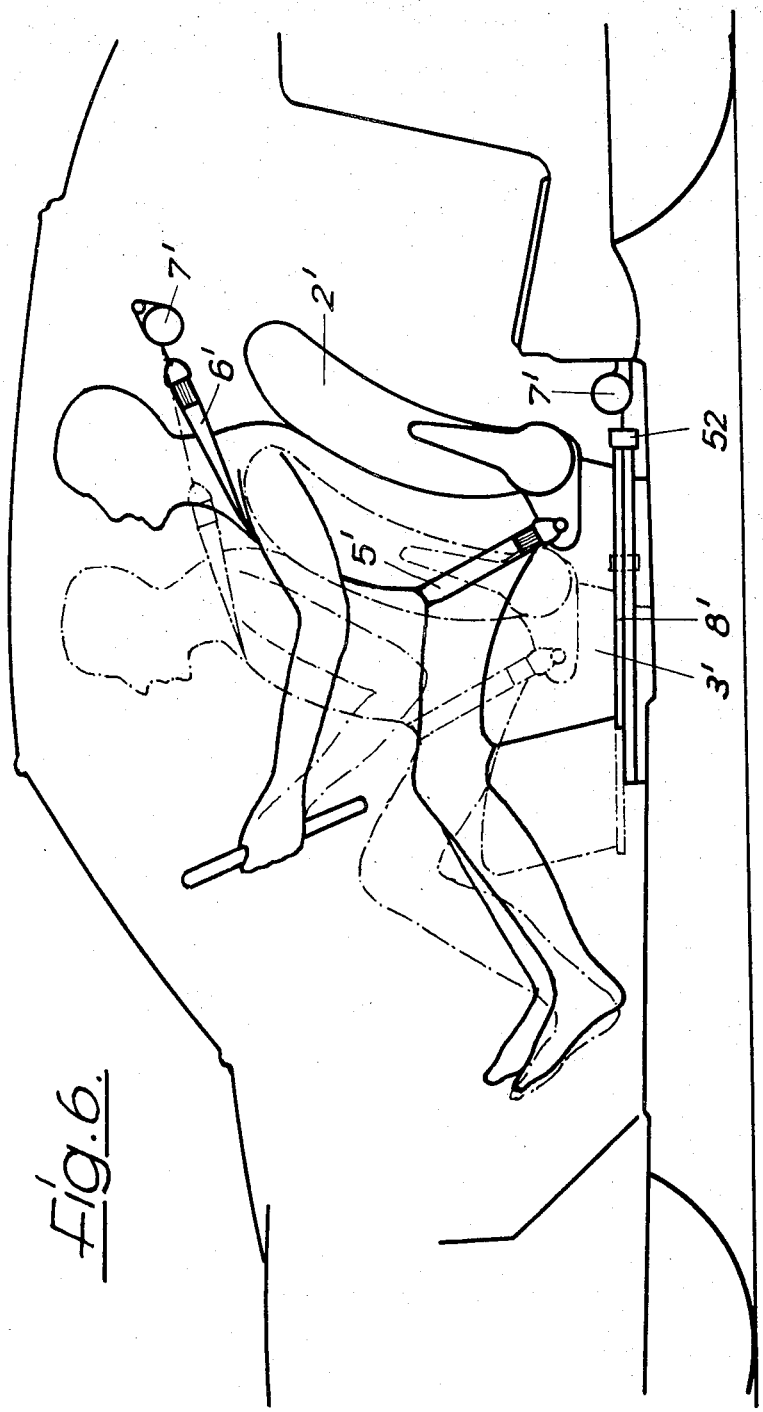

ENERGY TRANSFORMER FOR SECURING A SAFETY BELT ON A SEAT OF A VEHICLE

This invention is a continuation application of the co-pending Patent application Ser. No. 823,677, filed May 12, 1969, now abandoned.

The present invention relates to an energy transformer for yielding securing of a safety belt on a seat of a vehicle or on a vehicle itself or for yielding connection of a seat moveable relative to the vehicle with the vehicle.

In vehicles, in particular in automotive vehicles and airplanes, it is known to secure a safety belt for reasons of safety of the user of the vehicle. In the conventional safety belts, the ends of the belts are rigidly secured with the vehicle itself, or connected with the seat, as long as the connection of the seat with the vehicle provides sufficiently great security. The forces effective upon the body of the vehicle user during a deceleration of the vehicle are therefore dependent upon the characteristics of the safety belt. The conventionally used safety belts have a minimum breaking load of 1,800 kg. The total reception amounts with a load of 1300 kg about 70 m kg with a load of 1,800 kg about 100 m kg. About one half of the absorbed energy is transformed into a remaining deformation of the belt. Furthermore, it has been determined, that the forward displacement of the person retained by the safety belt due to the expansion of the safety belt in conventional belts amounts to about 20 to 30 cm of the load of the safety belt, the so-called loop load amounts to 1,800 kg.

In view of these characteristics of the known safety belts and the manner of their securing, a number of drawbacks result. In accordance with the present state of the accident investigations, the limit for the permissible load is disposed at chest height by about 900 kg and in hip height at about 1800 kg for adults. Forces going beyond that cause injuries endangering the life of the user of the vehicle. In case of children and older persons, the limit lies lower. In case of a deceleration of the vehicle for more than about 30 g to 40 9, the known safety belts lend often to a loop load at chest height of over 900 kg and thereby to mortal injuries. Already at a striking of an automotive vehicle to an obstacle with comparatively low speed, as a rule, peak values of deceleration occur, which lie above 30 g to 40 g. The known safety belts, can, though due to their dilatability absorb during a deceleration of the vehicle kinetic energy, which is stored in the body of the vehicle user, so that the timely run of the deceleration of the vehicle user does not coincide with the timely run of the deceleration of the vehicle itself. The possible labor reception of the known safety belts is, however, comparatively low. The safety belt can, therefore, prevent the transmission of deceleration of the vehicle of more than 30 g to 40 g to the vehicle user, if the kinetic energy, which is contained in the body of the vehicle user, is very low. In automotive vehicles, this limit value is obtained, when the vehicle strikes an obstacle frontally at a speed of about 40 km/hour. During a strike with a greater speed, the deceleration increases as a rule, to which the vehicle user is subjected, after an expansion of the safety belt to values, which lead to a loop load disposed above that of the possible limit.

Further drawbacks of the known safety belts reside in the fact, that they deform also elastically which can lead, due to the following recoil movement, to vertebrae injuries. Furthermore, due to the extension of the belt of about 20 to about 30 cm during the deceleration of the vehicle user, only a part of the present space between the vehicle user is exploited in the normal sitting position and the vehicle parts disposed in front of him in order to transform the kinetic energy contained in the body of the vehicle user into another form of energy. In automative vehicles, for instance, depending upon the type of the vehicle and position of the seat, the distance of the seat user to the vehicle parts disposed in front of him amount, by example, to 40 cm to 70 cm.

It is also known to connect the safety belt with the seat or vehicle by means of a damping device, whereby this damping device has elements, which are plastically deformed during a translation movement or are formed as so-called stretching members, which consist of bent metallic parts, which are stretched during a pull load with labor reception. These damping devices are however, charged with the drawback, that they are capable of absorbing only a part portion of the kinetic energy, which the person to be protected contains during the conventional vehicle speeds, as long as the device has an acceptable measurement to be built into a vehicle. A person of a weight of 75 kg has at a speed of 80 km/hour a kinetic energy of about 1,900 m kg. A further drawback, which also applies to the known safety belts, is to be seen in the fact, that the device, due to the plastic deformation cannot be reused after an accident.

It is furthermore known to press together a safety belt in the manner of a pulley block in three overlapping positions by a buckle, in order to bring about thereby a braking effect. The size of the braking effect is limited with this device by the permissible face pressure of the belt material. The energy transformed in this device into heat is accordingly low. A further drawback resides in the fact, that the belt material is strongly held in at the point of the high specific pressing below the convex buckle after a time period of use. The buckle opening sets itself then, in case of a pulling load, caused by the distance of the belts, crosswise to the pulling direction. By this arrangement, the belts are bent over with a small radius at the held-in point, which leads in case of a dynamic load, the striking duration amounting in case of accidents to about 5/100 of a second up to 15/100 of a second for self-locking and for tearing of the belt.

It is one object of the present invention to provide an energy transformer for securing a safety belt or a seat of a vehicle, which is capable of protecting a vehicle user tightened by a safety belt from injuries endangering his life, even then when the kinetic energy, which is present in the body of the vehicle user, is appreciably above that value, at which with the known devices the safety of the vehicle user can be assured.

It is another object of the present invention to provide an energy transformer for securing a safety belt or a seat of a vehicle, wherein in a holder a drum is rotatably mounted on which a bendable element is wound up and wherein the holder includes a braking device for the drum. Such energy transformer can assume, by means of its braking device, energy and can transform the same in an irreversible process into heat. Also in case of a space requirement which is not much greater than the space requirement of the securing devices for the known safety belts, with this energy transformer an energy reception can be obtained, which is a multiple of the energy reception of the known safety belts and damping devices. Of particular advantage is thereby that the maximum value of the forward displacement which the person to be protected can perform during a deceleration, can be adjusted exactly to the distance available between this person in a normal sitting position and the vehicle parts disposed in front of the person, because only the length of the bendable element, which is removed from the drum, has to be chosen correspondingly. Due to the rotating movement of the drum, it does not create any difficulties to provide a bendable element of the desired length on the drum. A complete exploitation of the distance of the vehicle user and the vehicle parts disposed in front of him for the forward displacement of the vehicle user during the deceleration is of importance for the reason, that the kinetic energy stored in the vehicle user, which energy can be absorbed by the energy transformer, without thereby overstepping the permissible limit, is so much greater, the greater the path available for the forward displacement. One can choose the greatest possible forward displacement even equal with the distance between the vehicle user and the vehicle parts disposed in front of him or even still greater, if the striking occurring thereby with all probability does not lead to injuries endangering the life. A further advantage of the energy transformer resides in the fact that it is reusable again after an accident.

The energy transformer in accordance with the present invention permits the use of non-elastic safety belts. This is of advantage in so far, as non-elastic belts are of a better value as to price than elastic belts and in particular since by the use of non-elastic belts the dangerous recoiling is avoided. Furthermore, the use of non-elastic belts is also suitable in so far as thereby the possible forward displacement of the vehicle user can be exactly determined.

The safety belts can be connected at one end by means of the energy transformer with the seat or with the vehicle and at the other end rigidly at the seat or at the vehicle. For avoiding of rotary injuries of the spine, it is, however, suitable to secure all ends of the safety belt by means of an energy transformer at the seat or at the vehicle. Furthermore, in this case, the measurements of the energy transformers can be kempt smaller, since they have to receive only one part of the total kinetic energy of the vehicle user. If the vehicle seat is mounted moveably relative to the vehicle in the vehicle, the seat is connected by means of one or a plurality of energy transformers with the vehicle, so that it displaces itself during a deceleration jointly with a user having a tightened safety belt, whereby the energy transformers assume the kinetic energy during the displacement process.

Due to the possible high specific brake moment, the use of a friction brake in form of a laminated brake as a braking device is the particular advantage.

In a preferred embodiment, the braking device is equipped with a setting means for the election of the braking moment. This is of advantage so far, as thereby for each user, for instance, in dependency upon his weight, the maximum braking moment can be set which results in a just permissible load of the body of the safety belt during the deceleration. This setting of the brake moment, which can occur for instance with a handle, permits also the adjustment on the permissible limit for children and older persons.

The drum of the energy transformer can be coupled with the holder member over a switchable free-wheel arrangement. The vehicle user has then the possibility by uncoupling the free-wheel arrangement to free the drum, so that he can move forwardly, which is desirable, for instance, in an automotive vehicle for operating of the hand brake or other operating activities. In this case it is suitable to equip the drum with a winding spring, so that the bendable element which has been removed from the drum can be wound up again.

The drum and the winding spring can be dimensioned also such that not only the bendable element, rather the total safety belt can be wound up. The safety belt is then not free on the seat, if it is not used.

In a preferred embodiment, the holding member is equipped with a securing device which is disposed at least nearly in the extension of the tangent to the outer diameter of the drum, which is formed by the part of the bendable element leading away from the holder member. By this arrangement, it is secured that no bending forces can be exerted on the securing device, if the bendable element is pulled off the drum, whereby breaks of the securing device can easily be avoided.

With these and other objects in view, which will become apparent in the following detailed description, the present invention will be clearly understood in connection with the accompanying drawings, in which:

FIG. 1 is a schematic side elevation of an automotive vehicle with a vehicle user, who has appled safety belts, which are secured at each end with an energy transformer, designed in accordance with the present invention, whereby the forward displacement of the user is indicated in case of a front strike of the vehicle in point-dotted lines;

FIG. 2 is an axial section through one of the energy transformers in accordance with FIG. 1;

FIG. 3 is a side elevation of a simplified embodiment of the energy transformer;

FIG. 4 is a section along the lines A-B of FIG. 3;

FIG. 5 is a side elevation similar to that of FIG. 3 indicating another embodiment of the present invention; and FIG. 6 is a side elevation of an automotive vehicle with a vehicle user who is secured by a safety belt on a seat displaceable in longitudinal direction of the vehicle and retained by an energy transformer in accordance with the present invention.

Referring now to the drawings, and in particular to FIGS. 1 and 2, an automotive vehicle 1 having a seat consisting of a back 2 and a seat portion 3 for a vehicle user 4 is equipped with two safety belts 5 and 6 by means of which the vehicle user can be retained on the seat. In the state having the seat belt tightened, the safety belt 5 is arranged over the hips of the vehicle user 4, while the safety belt 6 extends diagonally from one shoulder over the chest to the opposite hip.

The two non-elastically formed safety belts 5 and 6, which safety belts are not plastically deformed at all or at most non-essentially by the occurring forces, are secured at one end by means of an energy transformer 7 at the lower part of the seat 3 and at the body of the vehicle 1, respectively. The two other ends are jointly likewise secured by means of an energy transformer 7 on the seat part 3. The seat part 3 is guided displaceably in longitudinal direction in two rails 8, which are rigidly connected with the vehicle. A schematically shown locking device 9 connects the seat part 3 in any one of a plurality of chosen positions rigidly with the rails 8 and, thereby, with the vehicle.

Referring now again to the drawings, and in particular to FIG. 2, this Figure shows a section through one of the energy transformers 7 which is of the same design. In a housing consisting of two cups 50 and 51, a drum 10 having a recess 11 extending over its periphery is rotatably mounted. In the recess 11 is disposed a cable or cord 12 wound on a drum 10. It is obvious, that instead of the cable 12 also a band, for instance, of steel or a part of the safety belt itself can be used. In the central bore 13 of the drum 10 is arranged a bushing equipped with a multi-wedge profile 18 and rigidly connected with the drum 10. Between the drum 10 and a hub 15 are disposed alternately in radial planes adjacent arranged inner plates 16 and outer plates 17. The outer plates 17 enter the multi-wedge profile 18, and the inner plates 16 enter a multi-wedge profile 19 of the hub 15. By this arrangement, the outer plates 17 are connected for joint rotation with the drum 10 and the inner plates 16 are arranged for joint rotation with the hub 15. The one end of the hub 15 is formed as a flange 15', while the other end is equipped with an outer thread on which a nut 20 sits. By means of this nut 20, the plates 16 and 17 are pressed by means of an intermediate plate spring 21 on each other and the entire plate package is pressed against the flange 15'. The force with which the plates or laminated members are pressed on each other determines the braking moment of the braking device designed as a laminated brake for the drum 10. By rotation of the nut 20 therefore, a braking moment can be varied and can be set to the desired value. In the embodiment shown in the drawing in FIG. 2, the nut 20 is equipped with axial bores 20', into which the pins of a manual grip for rotation of the nut 20 can be inserted.

The hub 15 has a central bore 22 which is equipped with a multi-wedge profile, into which a coupling member 23 enters. Due to the multi-wedge profile, the coupling member 23 is axially displaceable relative to the hub 15. A gear disc 24 disposed coaxially with the coupling member 23 is connected with the housing cup 50, the teeth of the gear disc being arranged on the end face pointing towards the coupling member 23. With this teething operates a second gearing 25 provided on the coupling member 23. A pre-tensioned helical spring 26, which is disposed in a central bore of the coupling member 23 and supports itself indirectly on the hub 15, attempts to retain the gearing 25 in mesh with the gear disc 24. The coupling member 23 forms jointly with the gear disc 24 a switchable free-wheel arrangement. By a pressure to the cup 32 projecting from the housing cup 50 of a pin-like extension of the coupling member 23, the latter can be axially displaced and the gearing 25 can be brought out of mesh with the gear disc 24. The drum 10 can now rotate jointly with the laminated brake and the hub 15 relatively to the two housing cups 50 and 51 rigidly connected together.

A handle 33 is connected with the hub 15 for joint rotation, by means of which handle 33 the drum 10 can be turned for winding the cable 12. The handle 33 is not required if, as shown in the embodiment, a return winding spring 28 is provided. This return winding spring 28 formed as a helical spring is secured with one end at a bolt 27 of the housing cap 50 and with its other end by means of a rivet 29 at the drum 10.

The return winding spring 28 is pretensioned so much, that it is capable of winding completely the cable 12.

Since the embodiment as shown, the thickness of the flange 15' of the hub 15 is greater than the thickness of the drum 10 in the ring range 30 provided opposite the flange 15', a disc 31 is arranged next to the latter for equalization of the thickness difference.

The two housing cups 50 and 51 are equipped with an eye (not shown) serving as a securing device, which eye is, however, designed as the eye 140 disclosed in FIG. 3. By means of such eyes, the energy transformers 7 are secured on the seat part and at the car body, respectively. The ends of the safety belts 5 and 6 are secured each on the cable 12 of the corresponding energy transformers. Since the safety belt connected with the cable 12 is to be wound on the drum 10, the winding space of the drum and of the housing cups 50 and 51 must be chosen greater, as indicated in dotted lines in FIG. 2.

If in case of an accident on one of the safety belts 5 or 6 a greater force is exerted as that which results from the braking moment of the plates 16 and 17, as well as of the effective lever arm of the drum 10, on which the cable 12 attacks, the plates 16 and 17 slide with simultaneous energy assumption. The drum 10 turns thereby relative to the housing cups 50 and 51 and permits thereby an unwinding of the cable 12. The vehicle user 4 moves thereby forwardly. The greatest permissible forward displacement is indicated in FIG. 1 in point-dotted lines. Up to reaching this position indicated in point-dotted lines, the energy transformers prevent that the pressure exerted by the safety belts 5 and 6 on the vehicle user 5 surpasses the chosen greatest values, even if the deceleration of the vehicle reaches at times values which are beyond 30 g to 40 g. Only then when the kinetic energy, which the body of the vehicle user 4 contains prior to the deceleration, is greater than the energy capable to be assumed by the energy transformers 7, can the safety belts 5 and 6 lead to dangerous injuries of the vehicle user 4. Already with very low measurements of the energy transformers 7 it is possible, however, to assume a kinetic energy to about 1,900 m kg, if the total distance between the vehicle user 4 and the parts disposed in front of him are exploited, which amounts as an average to about 40 cm to 70 cm. The energy amount of 1,900 m kg corresponds with the kinetic energy, which a person of 75 kg weight has at a speed of 80 km/hour. If its taken into consideration further, that the medium value of the remaining deformation of an automotive vehicle in case of a frontal strike amounts to about 38 cm at 40 km/hour speed prior to the striking, about 55 cm at 60 km/hour and about 70 cm at 80 km/hour, whereby the peak values of the vehicle deceleration are reduced, one reaches vehicle speeds in case of a front striking, which can be survived by the vehicle user by using the energy transformer according to the present invention without injuries endangering the life, which speeds are for a multiple greater than those speeds, in which in case of a frontal striking a vehicle user has the chance by using the known safety belts to survive the accident.

The return coiling of the cable 12 pulled out from the drum 10 can be made manually by means of the handle 33 or automatically by means of the return coil spring 28. By the pressure on the cup 32, the teething 25 is brought out of mesh with the gear disc 23 and the drum can be freely rotated.

The free-wheel arrangement formed by the coupling member 23 and the gear disc 24 can jointly be used with the return coil spring 28, in order to permit to the vehicle user temporarily a certain freedom of movement forwardly, for instance, for operation of the manual brake or for another operating activity. The vehicle user requires therefor only to press the cup 32. The cable 12 can then be pulled off the drum 10, without rendering effective the laminated brake. If the vehicle user 4 moves then back again, the return coil spring 28 causes the winding of the cable 10. In a similar manner, this free-wheel arrangement can be used also with the return coil device, to wind the safety belt completely on the drum, if it is not required. Such switchable freewheel arrangement has the advantage over the known devices, which permit a slow withdrawal of the safety belt from a winding device and block the same only with a fast removal, so that in case of an accident no time is lost until the holding effect of the safety belt sets in. The plates 16 and 17 can be equipped with different friction layers for obtaining desired force-path-characteristics.

Referring now again to the drawings, and in particular to FIGS. 3 to 5, additional embodiments of the present invention are disclosed. Those parts which conform to the parts of the embodiments disclosed in FIG. 2 carry the same numerals, however, enlarged by 100. The embodiments disclosed in FIGS. 3 and 4 differ from that in FIG. 2 substantially by the fact that, for economical reasons, the free-wheel arrangement is omitted. The inner plates 116 project into the multi-wedge profile 119 of a hub 138, which is connected with one housing cup 151. A nut 139 is rigidly connected with the other housing cup 151. By rotation of a screw 134 equipped with a grip, the plates 116 and 117 are pressed towards each other more or less by means of a plate spring 121 and thus the force, which is to be applied, in order to remove a band 112 form the drum 110 through endless numbers of positions. After the removal of the band 112, the screw 134 is screwed out, the housing cup 151 is lifted and the band 112 is recoiled manually. After the assembly by means of the screw 134, the desired braking moment is set again in accordance with a scale 137. The scale 137 can have markers which relate to the weight of the person using the safety belt. On the scale 137, however, also the belt unwinding force or the loop load occurring in connection with a particular type of safety belt can be indicated.

The two housing cups 150 and 151 form jointly a projection which has a boring 140. The center of the bore 140 lies on the tangent 142 to the drum 110, which is determined by the part of the band 112 has been removed. By this arrangement, it is avoided that a bending moment is exerted at the securing point, whereby a disturbance-free unwinding of the band 112 during pulling-off is assured.

The embodiment disclosed in FIG. 5 differs from the embodiment shown in FIGS. 3 and 4 only by the fact that instead of the screw 134, a screw 135 having a hexagon head and an indicator 136 is used and that the securing device is equipped with a threaded pin 141, the longitudinal axis of which is disposed in the tangent formed through the pulled off part of the band 112 on the drum.

As shown in FIG. 6, the energy transformer, in accordance with the present invention, can even be used, if in case of a retardation or deceleration, the vehicle seat can be displaced in the movement direction of the vehicle relative to the latter and the vehicle user is retained by the safety belts within the range of the hip in engagement on the seat. In this case, the seat part 3' of the seat which is displaceably guided in rails 8', is retained normally in engagement on an abutment 52 by means of one or a plurality of energy transformers 7', which can be designed exactly as the energy transformer 7. The upper end of the safety belt 61 is secured on the vehicle itself by means of one of the energy transformers 7', while the other end and the two ends of the safety belt 5' running over the hip are secured without energy transformers on the seat part 3 40 . The upper end of the safety belt 6' could also be secured on the back of the seat. It is obvious that the back of the seat must then be dimensioned such, that it assumes the occurring load.

Upon overstepping of a value of the deceleration dependent upon the setting of the energy transformer 7', the seat 2', 3' moves relative to the vehicle in forward direction, whereby the cable of the energy transformer 7' is pulled off. The energy transformer 7' assumes thereby energy and transforms, the latter into heat. Furthermore, the upper body of the vehicle user can be lifted from the back 2' of the seat. The manner of the forward displacement of the vehicle user during the deceleration process can be influenced by the braking moment-setting of the energy transformers.

While I have disclosed several embodiments of the present invention, it is to be understood that these embodiments are given by example only and not in a limiting sense.

I claim:

1. In combination with a safety belt, an energy transformer securing a safety belt selectively to a seat of a vehicle and to a vehicle itself, comprising a housing, a drum rotatably mounted and in said housing having a recess, belt means wound on said drum, said drum having a central bore, a hub disposed in said recess, a laminated friction brake including inner plates and outer plates, disposed parallel to and adjacent each other, said outer plates being secured to said drum for joint rotation with the latter, said inner plates being secured to said hub for joint rotation with the latter, spring means for pressing said plates against each other, means for varying the pressure applied to said plates, a coupling member axially displaceable relative to and disposed in the central bore of said hub, a disc having a first gearing disposed coaxially with said coupling member and connected with said housing, a second gearing provided on one end face of said coupling member engageable with said first gearing, and releasable therefrom upon displacement of said coupling member, spring means for retaining said first gearing in engagement with said second gearing, and said coupling member forming jointly with said disc an overrunning clutch to permit rotation of said drum jointly with said inner plates connected with said housing.

2. The energy transformer, as set forth in claim 1, which includes a spiral spring disposed in said housing and connected at one end with said housing and at the other end with said drum.

3. The energy transformer, as set forth in claim 1, wherein said housing has a cylindrical inner chamber and said drum is coaxially mounted in and relative to said inner chamber.

* * * * *

UNITED STATES PATENT OFFICE
CERTIFICATE OF CORRECTION

PATENT NO. : 3,848,828
DATED : 19 November 1974
INVENTOR(S) : Hans KÜHL

It is certified that error appears in the above-identified patent and that said Letters Patent are hereby corrected as shown below:

Correct the inventor's name from "Hans Kuhl"

to -- Hans Kühl -- .

Signed and sealed this 29th day of April 1975.

(SEAL)
Attest:

RUTH C. MASON
Attesting Officer

C. MARSHALL DANN
Commissioner of Patents
and Trademarks